(12) United States Patent
Zheng et al.

(10) Patent No.: US 8,886,847 B2
(45) Date of Patent: Nov. 11, 2014

(54) REMOTE CONTROL METHOD, SYSTEM AND ASSOCIATED APPARATUS FOR SMART TV

(71) Applicant: MStar Semiconductor, Inc., Hsinchu County (TW)

(72) Inventors: Ren-Zhen Zheng, Hsinchu County (TW); Jian-Qun Jiang, Hsinchu County (TW); Jun Ying, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 0 days.

(21) Appl. No.: 13/753,696

(22) Filed: Jan. 30, 2013

(65) Prior Publication Data

US 2013/0246664 A1 Sep. 19, 2013

(30) Foreign Application Priority Data

Mar. 16, 2012 (CN) .......................... 2012 1 0070684

(51) Int. Cl.
*G06F 3/00* (2006.01)
*G06F 13/10* (2006.01)

(52) U.S. Cl.
CPC .................................. *G06F 13/102* (2013.01)
USPC ............... 710/8; 709/223; 709/224; 709/227

(58) Field of Classification Search
None
See application file for complete search history.

(56) References Cited

U.S. PATENT DOCUMENTS

| 8,429,309 | B2* | 4/2013 | Han et al. .......................... 710/8 |
| 8,521,857 | B2* | 8/2013 | Maxwell et al. .............. 709/223 |
| 2006/0184661 | A1* | 8/2006 | Weisman et al. ............. 709/224 |
| 2007/0004436 | A1* | 1/2007 | Stirbu .......................... 455/503 |
| 2010/0042233 | A1* | 2/2010 | Han et al. ........................ 700/90 |
| 2012/0077586 | A1* | 3/2012 | Pishevar ......................... 463/31 |
| 2012/0185580 | A1* | 7/2012 | Detert .......................... 709/223 |
| 2013/0010018 | A1* | 1/2013 | Economy ...................... 345/691 |

* cited by examiner

*Primary Examiner* — Michael Sun
(74) *Attorney, Agent, or Firm* — WPAT, PC; Justin King

(57) ABSTRACT

A remote control method for a smart TV is provided. The method includes: the smart TV receiving function request information from a portable device in a network based on Universal Plug and Play (UPnP); the smart TV transmitting function information to the portable device in response to the function request information; the smart TV receiving hardware information including control information replied from the portable device according to the function request information; and the smart TV performing an operation control according to the hardware information. Thus, user experiences and interests are enhanced by controlling the smart TV through somatosensory system control or touch control.

6 Claims, 4 Drawing Sheets

REMOTE CONTROL METHOD, SYSTEM AND ASSOCIATED APPARATUS FOR SMART TV

This application claims the benefit of People's Republic of China application Serial No. 201210070684.3, filed Mar. 16, 2012, the subject matter of which is fully incorporated herein by reference.

BACKGROUND OF THE INVENTION

1. Field of the Invention

The disclosure relates in general to a smart TV, and more particularly to a remote control method, system, and associated apparatus for a smart TV.

2. Description of the Related Art

Portable devices such as smart phones and tablet computers are getting more and more prevalent in the modern lifestyle. Operating systems of smart phones and tablet computers include Symbian, Windows Mobile, iOS (an Apple operating system), Linux, Palm OS, and Blackberry OS. The Linux operating system is further divided into Android, Maemo, MeeGo, and WebOS to name a few. The above operating systems fundamentally support single-touch control, multi-touch control, or somatosensory system control (which may include gravity sensing, direction sensing, and temperature sensing).

The number of third-party developers applying the above operating systems (such as Android and iOS) to portable devices requiring this type of input (e.g., for such applications as car racing games) is ever-growing. These third-party developers usually implement operation controls through a physical hardware device such as gravity sensor or a touch screen. As a result, techniques for gravity sensing and touch control for portable devices have also matured.

In the field of smart TVs, the application of a hardware device including a touch screen and a gravity sensor to control a smart TV is extremely challenging under cost and hardware condition constraints, such that the smart and convenient operation controls using touch control and gravity sensing cannot be easily exercised. As a result, even though a current smart TV is able to acquire applications from third-party developers through the Internet, certain third-party developer applications that require gravity sensing and touch control for operation controls remain impracticable for usage on a smart TV.

Therefore, the disclosure aims to provide a solution capable of implementing operations similar to those in a portable device on a smart TV, such as somatosensory system control or touch control functions.

SUMMARY OF THE INVENTION

The disclosure is directed to a remote control method, system, and associated apparatus for a smart TV which solves technical difficulties of implementing operations in a smart TV similar to those implemented in a portable device.

According to an aspect of the disclosure, a remote control method for a smart TV is provided by the disclosure. The method includes the steps of: receiving function request information from a portable device by a smart TV in a Universal Plug and Play (UPnP) network; transmitting function information of the smart TV to the portable device in response to the function request information; receiving hardware information replied from the portable device according to the function information; and performing an operation control according to the hardware information.

A multitude of virtual devices are preset in the modern smart TV. The hardware information, including driver information, is written into one corresponding virtual device. The corresponding virtual device is then driven according to the driver information.

The hardware information further includes control information. The step of performing the operation control according to the hardware information includes: generating operation information according to the control information by the virtual device; and transmitting the operation information to a third-party application or an operating system provided at the smart TV terminal to perform the operation control.

According to another aspect of the disclosure, a smart TV is provided. The smart TV is signally connected to a portable device via a UPnP network. The smart TV includes: a device declaration module, for receiving function request information from the portable device; a function description module, for transmitting function information in response to the function request information to the portable device; a control receiving module, for receiving hardware information replied from the portable device according to the function information, wherein the hardware information includes control information; and a virtual driver module, for performing an operation control according to the hardware information.

The control receiving module includes: a writing unit, for writing the hardware information into corresponding virtual devices preset in the smart TV, wherein the hardware information includes driver information; and an initialization unit, for driving a corresponding virtual device of the virtual devices according to the driver information.

The virtual driver module includes: an operation information unit, for generating operation information according to the control information; and an execution unit, for transmitting the operation information to a third-party application at the smart TV terminal or a local-end operating system to perform the operation control.

According to another aspect of the disclosure, a remote control method for a smart TV applied to a portable device is provided. The remote control method includes: in a UPnP network, transmitting function request information to a smart TV in the network; receiving function information replied in response to the function request information from the smart TV; and transmitting hardware information corresponding to the function information to the smart TV, wherein the hardware information includes control information for operating the smart TV, so as to prompt the smart TV to perform an operation control according to the control information.

The remote control method further includes: performing function matching on the function information and functions of the portable device, and collecting hardware information corresponding to the function information.

According to another aspect of the disclosure, a portable device is provided. The portable device, for remote controlling a smart TV based on a UPnP network, includes: a device locating module, for transmitting function request information to the smart TV via the network; a function acquiring module, for receiving function information replied in response to the function request information from the smart TV; and a remote control module, for transmitting hardware information corresponding to the function information to the smart TV, wherein the hardware information includes control information for operating the smart TV, so as to prompt the smart TV to perform an operation control according to the control information.

The portable device further includes: a hardware information retrieving module, for performing function matching on the function information and functions of the portable device to collect the hardware information, and transmitting the collected hardware information to the smart TV.

According to yet another aspect of the disclosure, a remote control system for a smart TV is provided. The remote control system includes a portable device and a smart TV. The portable device includes: a device locating module, for transmitting function request information in a UPnP network; a function acquiring module, for receiving function information; and a remote control module, for transmitting hardware information corresponding to the function information. The smart TV includes: a device declaration module, for receiving the function request information from the device locating module; a function description module, for transmitting the function information of the smart TV in response to the function request information to the function acquiring module; a control receiving module, for receiving the hardware information, wherein the hardware information includes control information for operating the smart TV; and a virtual driver module, for performing an operation control according to the hardware information.

The control receiving module further includes: a writing module, for writing the hardware information into a corresponding virtual device of the virtual devices preset in the smart TV, wherein the hardware information further includes driver information; and an initialization unit, for driving the corresponding virtual device according to the written driver information.

In the disclosure, by fully exercising the zero-configuration and auto-searching functions featured by the UPnP, the remote control method, system and associated apparatus for a smart TV provide communication between the smart TV and a portable device. When operating the portable device, hardware information is transmitted to the smart TV to control the smart TV, such that the smart TV can be directly controlled via somatosensory system control or touch control functions of the portable device. Thus, user experiences and interests are enhanced as the smart TV can be controlled through somatosensory system control or touch control.

The above and other aspects of the disclosure will become better understood with regard to the following detailed description of the preferred but non-limiting embodiments. The following description is made with reference to the accompanying drawings.

DETAILED DESCRIPTION OF THE DISCLOSURE

In all the embodiments of the disclosure below, apart from a special declaration, a portable device is a smart handheld device, e.g., a smart phone, a tablet computer, or a handwriting electronic device. For example, an operating system of the portable device is Symbian, Windows, Mobile, iOS, Linux, Palm OS, or Blackberry OS, and supports functions of single-touch control, multi-touch control, or a somatosensory control system. Regarding networking, the smart TV and the portable device are in a network based on a Universal Plug and Play (UPnP) structure. The UPnP network supports zero-configuration and auto-test in a distributed and open approach, so that a seamless connection between the smart TV and the portable device is achieved for information transmission.

For example, an operating system of the smart TV includes Android, iOS, Windows Mobile, and Windows CE; a virtual device includes a mouse, a single-touch device, a multi-touch device, a gravity sensor, a keyboard, an infrared camera, and a microphone. Further, for example, an operating system of the portable device includes Android, iOS, Windows Mobile, and Windows CE.

Figure 1:
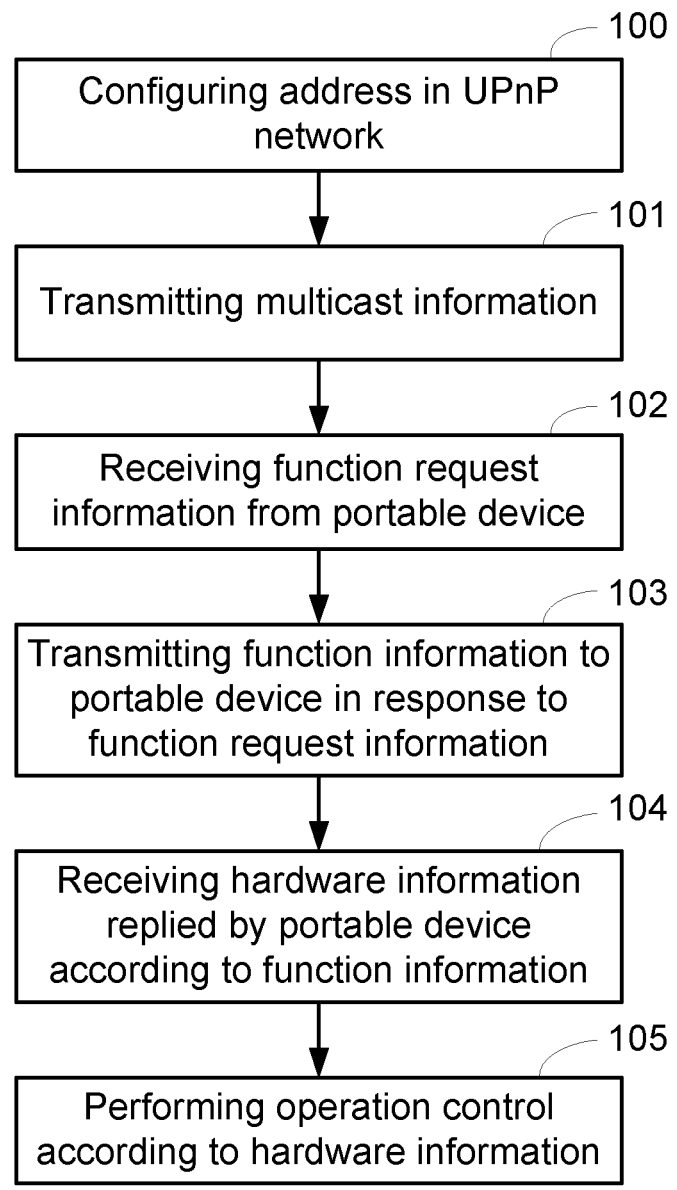
FIG. 1 is a flowchart of a remote control method for a smart TV according to an embodiment of the disclosure.

FIG. 1 shows a flowchart of a remote control method for a smart TV according to an embodiment of the disclosure.

In step 100, addresses in a UPnP network are configured.

In this embodiment, when performing Internet access communication, adopting a common Internet communication protocol instead of requiring an additional device driver, mutual communication via a local area network (LAN) for device control and management between the smart TV and the portable device can be implemented. The LAN may be a household network, into which the smart TV and the portable device enter after being activated, entering a corresponding signal range, or actively initiating a wireless connection. More specifically, the smart TV and the portable device may join the above network via a telecommunication line, Power Line (e.g., power line Communication (PLC)), Ethernet, Infrared Data Association (IrDA), WiFi, Bluetooth, and Firewire (IEEE 1394). After joining the network, for the smart TV and the portable device, addresses at a local end may be configured automatically and randomly, or may be configured manually depending on actual needs according to Dynamic Host Configuration Protocol (DHCP).

In step 101, multicast information is transmitted. Multicasting is the broadcasting and transmission of related information to a group of destinations simultaneously in a single transmission from a source. After the smart TV and the portable device join the network and obtain the addresses at the local end, information (multicast) and services can be transmitted within the network according to a UPnP detection protocol. Further, the smart TV and the portable can locate each other through searching.

Further, when only one smart TV and one portable device are present in the network, a connection can be automatically established without additional operations. For example, after entering the network, the portable device searches for and finds the smart TV in the network, and acquires basic information associated with the device. Through the basic information, device information, service information, identity information, and specific information such as a physical connection address of the searched device can be learned. The UPnP detection protocol is based on a common protocol such as the Simple Service Discovery Protocol (SSDP).

In step 102, the smart TV receives function request information transmitted from the portable device. The smart TV responds and establishes connection after receiving the multicast information, and then transmits descriptive information to the portable device. The descriptive information may in Extensible Markup Language (XML) described by the UPnP.

The descriptive information usually includes a brand name, a manufacturer, an associated model number, a product number, a serial number, and detailed information pointed by a specific Uniform Resource Locator (URL) of the manufacturer. Further, the descriptive information includes a list of embedded devices and services, control, event transmission and function information of the embedded devices and services, and URLs of specific information. The portable device transmits the function request information according to the above descriptive information.

In step 103, the smart TV transmits function information to the portable device in response to the function request information.

After receiving the function request information, the smart TV transmits specific function information to the portable device. For example, the specific function information includes commands, operations, services supported, and operation variables and parameters.

For example, status information of the devices in operation in the smart TV is presented through the operation variables and parameters, data type, range, and events in the function information. The portable device then performs function matching on functions supported by the portable device and the function information of the smart TV. For example, the portable device determines whether the smart TV supports single-touch or multi-touch control, or gravity sensing. The portable device then collects hardware information corresponding to the function information, and transmits the hardware information to the smart TV. More specifically, step 103 performs the handshaking between terminals to facilitate subsequent remote control operations. The hardware information includes corresponding control messages and driver information generated when operating the portable device. The control messages are exchanged through the common Simple Object Access Protocol (SOAP), and are also described in XML.

In step 104, the smart TV receives the hardware information transmitted from the portable device according to the function information. The hardware information includes control information.

Multiple virtual devices are provided in advance at a terminal of the smart TV. After receiving the hardware information, the smart TV converts the hardware information to driver information, writes the driver information into a corresponding virtual device, and drives the corresponding virtual device according to the driver information written therein.

In step 105, an operation control is performed according to the hardware information.

Thus, the virtual device performs an operation according to the control information in the hardware information to generate operation information, and accesses the operation information from the operating system of the smart TV. The operation information converted from the control information of the portable device is transmitted by the operating system to a third-party application operating at the local end (i.e., the smart TV) or the operating system of the local end to perform an operation control.

After successfully driving the virtual device, remote control on the smart TV can be implemented through operating the portable device, e.g., touch control or gravity sensing control. More specifically, in a situation where the smart TV is incapable of directly implementing control methods such as touch control and gravity sensing control, the above functions (i.e., touch control and gravity sensing control) can be indirectly implemented by the portable device supporting the functions according to the above remote control method.

It should be noted that, step 104 to step 105 may be a real-time loop. That is, after driving the virtual device, the control information that a client end subsequently practices on the portable device may be in real-time transmitted back to the virtual device. The operation information converted from the control information of the portable device is then transmitted by the operating system to the third-party application or the operating system itself. Details for implementing the above are known to a person having ordinary skill in the art, and shall be omitted herein for the sake of brevity.

Further, after the smart TV performs an operation according to the control information of the portable device, effects associated with the control information can be transmitted back and displayed in form of variables. For example, assuming that a car racing game is executed on the smart TV, turning directions, accelerating, decelerating, and turning on and off various other game features can be controlled via the gravity sensing function of the portable device.

Figure 2:
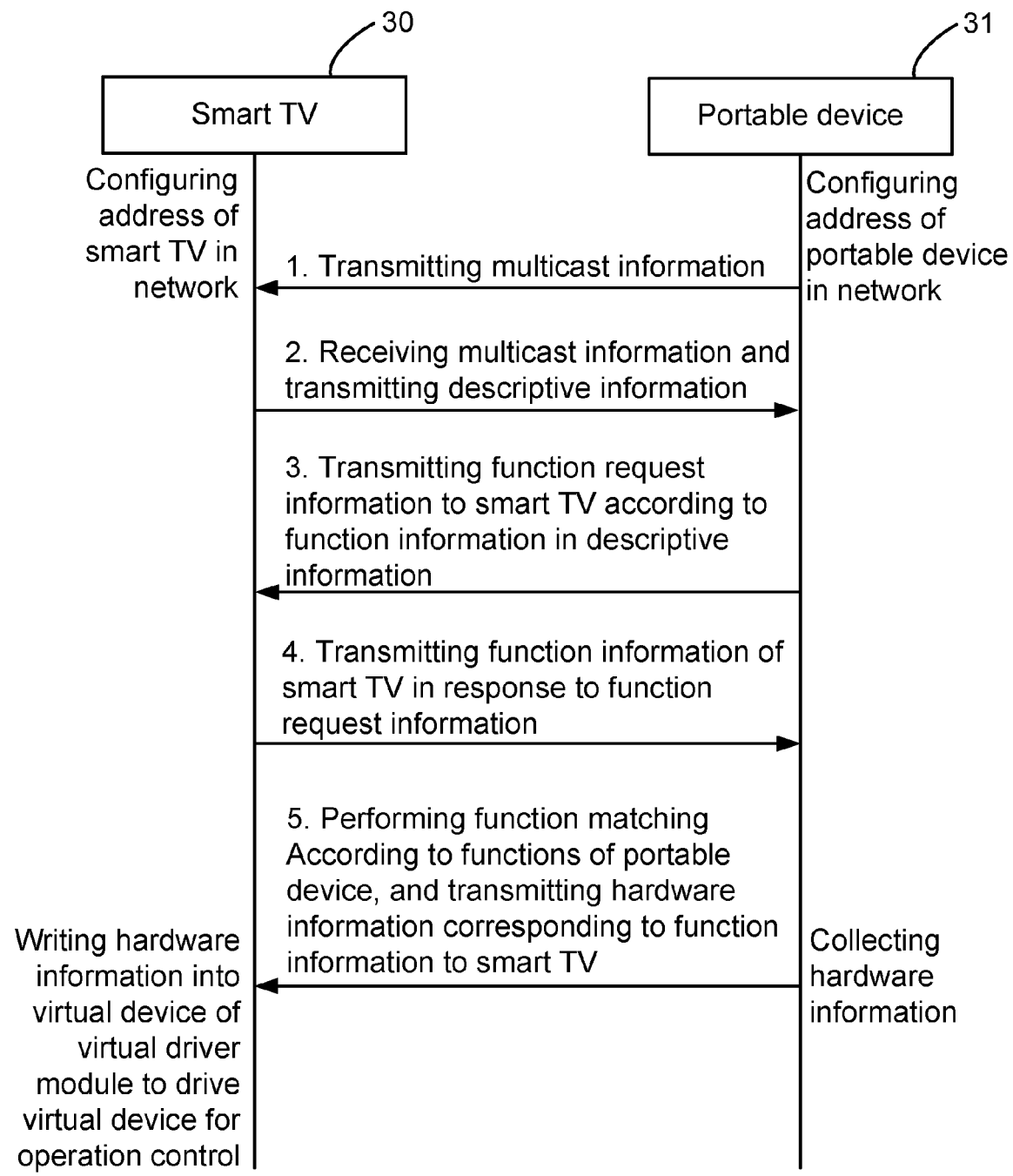
FIG. 2 is a schematic diagram of information exchange of a remote control method for a smart TV according to an embodiment of the disclosure.

FIG. 2 shows a schematic diagram of information exchange of a remote control method for a smart TV according to an embodiment of the disclosure.

As previously stated, the addresses of the smart TV and the portable device in the network can be configured automatically or manually.

With reference to FIGS. 1 and 2, the information exchange between the smart TV and the portable devices includes the following steps. The portable device transmits multicast information to (at least) the smart TV in the UPnP network. The smart TV receives the multicast information, and transmits descriptive information to the portable device in response to the multicast information. According to function information in the descriptive information, the portable device transmits function request information to the smart TV. In response to the function request information, the smart TV transmits its function information to the portable device. The portable device performs function matching on the functions supported by the portable device and the function information of the smart TV, collects hardware information corresponding to the function information, and transmits the collected hardware information to the smart TV. The smart TV writes the hardware information into a virtual device of a virtual driver module, and drives the virtual device to operate.

Details of the above process can be referred and easily appreciated from the foregoing process of the remote control method for a smart TV by a person having ordinary skill in the art, and shall be omitted herein for the sake of brevity.

Figure 3:
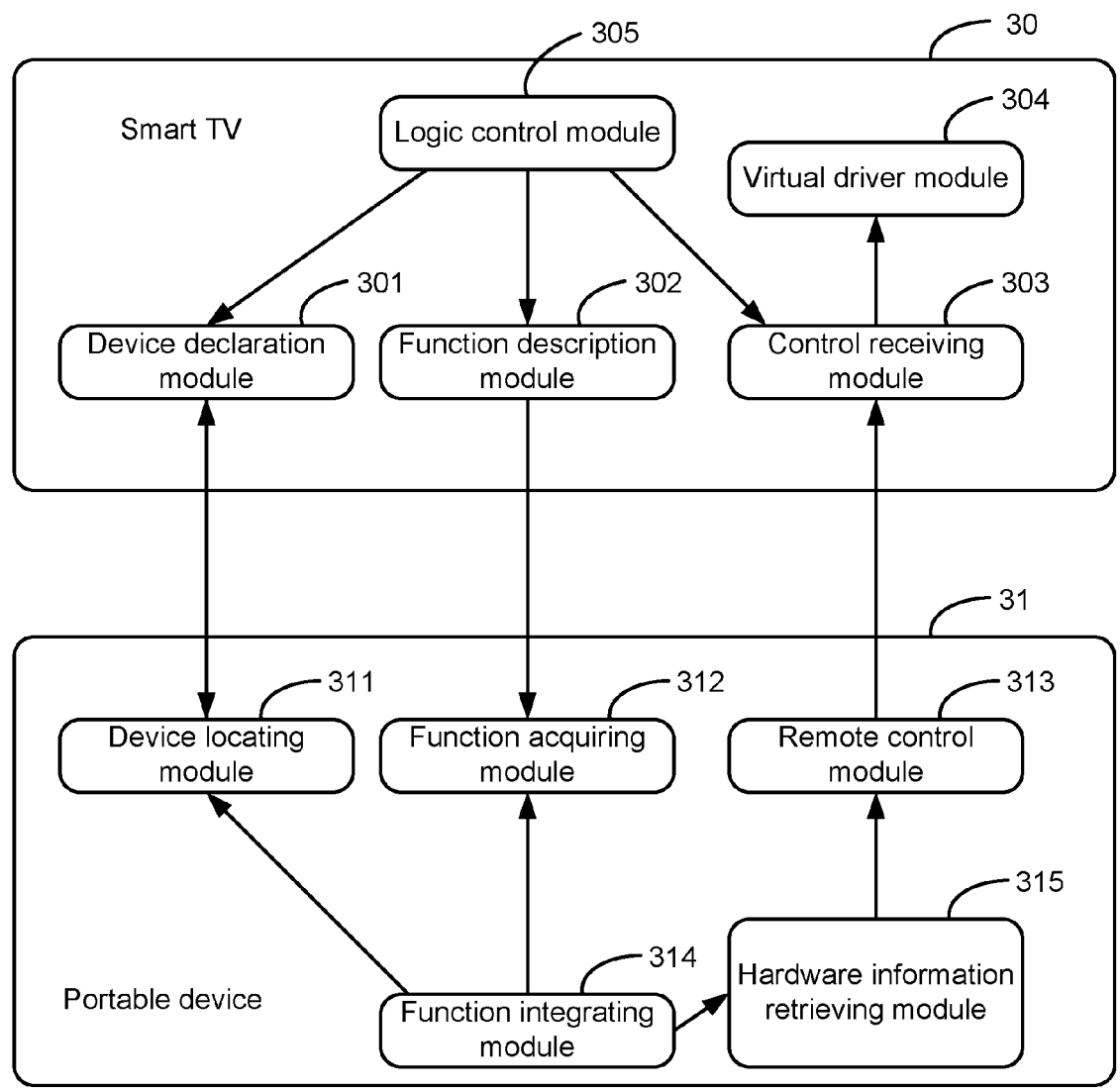
FIG. 3 is schematic diagram depicting connections among modules of a remote control system a smart TV according to an embodiment of the disclosure.

FIG. 3 shows a schematic diagram depicting connections among modules of a remote control system of a smart TV according to an embodiment of the disclosure. In this embodiment, a smart TV 30 includes a device declaration module 301, a function description module 302, a control receiving module 303, a virtual driver module 304, and a logic control module 305. The device declaration module 301, the function description module 302, and the control receiving module 303 are connected to the logic control module 305; the virtual driver module 304 is connected to the control receiving module 303.

Operational details of the modules in the smart TV are described below.

In a UPnP network, the device declaration module 301 receives function request information from a portable device 31. The function description module 302 transmits its function information to the portable device 31 in response to the function request information received by the device declaration module 301. The control receiving module 303 receives hardware information based on the function information, and transmits the hardware information to the virtual driver module 304. The virtual driver module 304 performs an operation control according to the hardware information received by the control receiving module 303. It should be noted that, the hardware information includes control information.

The logic control module 305 flexibly integrates the device declaration module 301, the function description module 302, and the control receiving module 303 to perform a centralized resource distribution. For example, the logic control module 305 serves for functions similar to those of a central processing unit.

The smart TV 30 is further provided with multiple virtual devices. In an alternative embodiment, the control receiving module 303 may include function units offering specific functions, e.g., a writing unit and an initialization unit.

The writing unit writes the hardware information into a corresponding virtual device. The hardware information further includes driver information. The initialization unit then drives a corresponding virtual device according to the driver information written in the virtual device, so as to make subsequent operation controls more convenient.

Correspondingly, the virtual driver module 304 may also include an operation information unit and an execution unit. Through the operation unit, an operation is performed according to the corresponding control information for operating the portable device 31 in the hardware information to generate operation information. Through the execution unit, the operation information is transmitted to the third-party application or the operating system at the local end to perform an operation control. For example, when a user executes a car racing game on the smart TV, turning directions, accelerating, decelerating, and turning on and off various other game features can be controlled via the gravity sensing function of the portable device.

Other operation details of the smart TV of the disclosure can be referred and easily appreciated from the foregoing process of the remote control method for a smart TV by a person having ordinary skill in the art, and shall be omitted herein for the sake of brevity.

Again referring to FIG. 3, the portable device 31 includes a device locating module 311, a function acquiring module 312, a remote control module 313, a function integrating module 314, and a hardware information retrieving module 315. The device locating module 311, the function acquiring module 312, and the hardware information retrieving module 315 are connected to the function integrating module 314. Through the function integrating module 314, resources and operations of the device locating module 311, the function acquiring module 312, and the hardware information retrieving module 315 are managed and appropriately distributed. The hardware information retrieving module 315 is connected to the remote control module 313.

Operation details of the portable device 31 are described below. In a UPnP network, the device locating module 311 of the portable device 31 transmits function request information to the device declaration module 301 of the smart TV 30. The function acquiring module 312 receives function information transmitted from the function descriptive module 302 in response to the function request information. The remote control module 313 transmits hardware information corresponding to the function information transmitted to the control receiving module 303. The hardware information retrieving module 315 performs function matching and functions supported by the portable device 31 and the function information, and collects hardware information corresponding to the function information.

In this embodiment, the portable device 31 in principle controls the smart TV 30 remotely via the hardware information retrieving module 315 and the remote control module 313, thereby assisting the smart TV 30 in implementing techniques such as single-touch control, multi-touch control, and gravity sensing. Therefore, while overcoming difficulties of the prior art, the above approach of the disclosure provides enhanced user experiences and interests.

Figure 4:
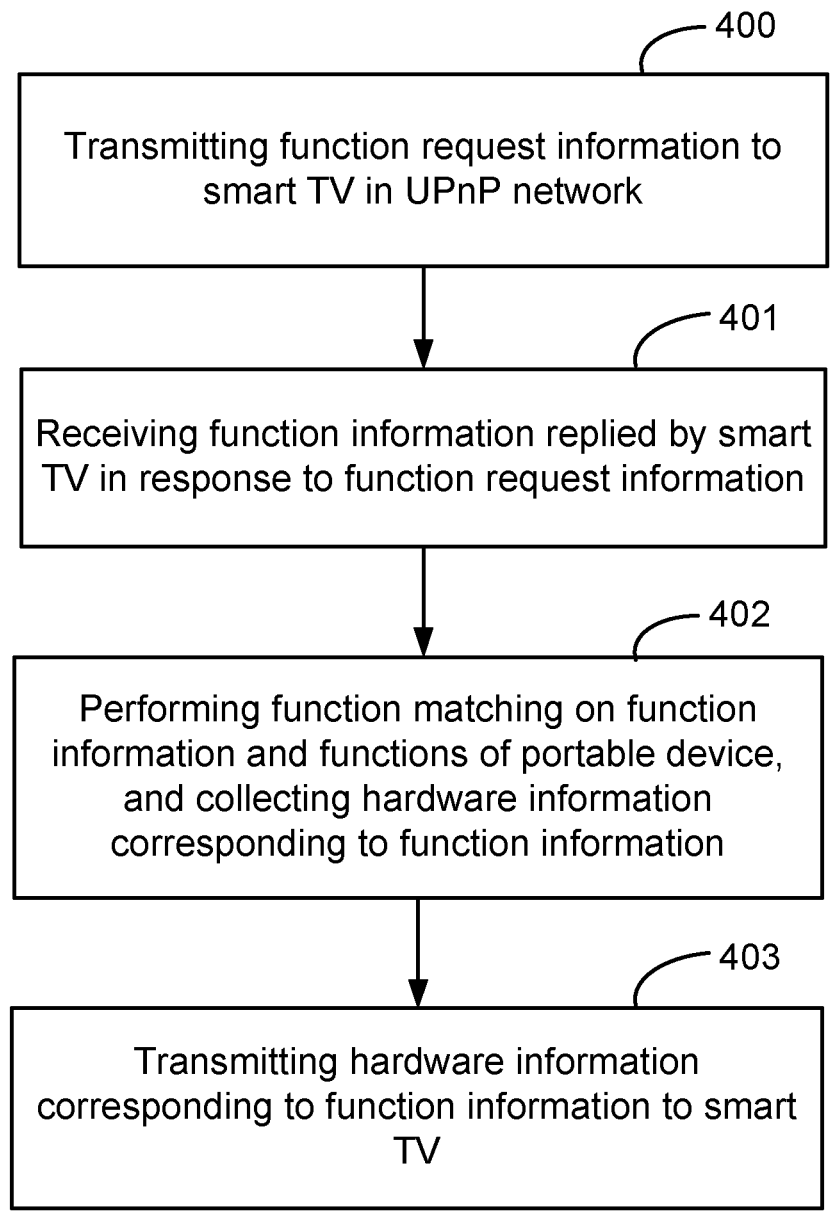
FIG. 4 is a flowchart of a remote control method for a smart TV applied to a portable device according to an embodiment of the disclosure.

FIG. 4 shows a flowchart of a remote control method for a smart TV applied by a portable device. In this embodiment, the portable device is chiefly for remote controlling the smart TV. Details of the portable device and the smart TV can be appreciated with reference to FIGS. 2 and 3 by a personal having ordinary skill in the art, and shall be omitted there for the sake of brevity.

In this embodiment, the remote control method for a smart TV applied to a portable device includes the following steps.

In a UPnP network, in step 400, function request information is transmitted to the smart TV in the network. In step 401, function information replied from the smart TV in response to the function request information is received. In step 402, function matching is performed on supported functions of the portable device and the function information, and hardware information corresponding to the function information is collected. In step 403, the hardware information, including control information for operating the smart TV, corresponding to the function information is transmitted to the smart TV to prompt the smart TV to perform an operation control according to the control information.

More specifically, the smart TV is provided with multiple virtual devices. A corresponding virtual device of the virtual devices performs an operation according to the control information in the hardware information to generate operation information. The control information is accessed by an operating system of the smart TV. The operation information converted from the control information of the portable device is transmitted by the operating system to a third-party application or an operating system at the local end to perform an operation control. For example, assuming a car racing game is executed on the smart TV, turning directions, accelerating, decelerating, and turning on and off various other game features can be controlled via the gravity sensing function of the portable device.

Again referring to FIG. 3, in this embodiment, as a summary of associated descriptions of the smart TV 30 and the portable device 31, an operation process of a remote control system of a smart TV according to an embodiment of the disclosure is as follows.

At the portable device end: the device locating module 311 transmits the function request information to the function declaration module 301 in the network where the smart TV 30 is located; the function acquiring module 312 receives the function information transmitted from the function description module 302; and the remote control module 313 transmits the hardware information corresponding to the function information to the control receiving module 303.

At the smart TV end: in the UPnP network, the device declaration module 301 receives the function request information transmitted from the device locating module 311; the function description module 302 transmits the function information of the smart TV 30 to the function acquiring module 312 in response to the function request information received by the device declaration module 301; the control receiving module 303 receives the hardware information that the remote control module 303 replies according to the function information transmitted from the function description module 302, wherein the hardware information includes the control information; and the virtual driver module 304 performs an operation control according to the hardware information received by the control receiving module 303.

Further, the hardware information retrieving module 315 performs function matching on the function information and supported functions of the portable device 31, and identifies and collects the corresponding hardware information.

Apart from implementing the foregoing remote control method and apparatus for a smart TV, the embodiment is also capable of displaying program information or playing information on the smart TV 30 via the portable device 31. That is, contents of the smart TV 30 can be played via the portable device 31, and the portable device 31 can be further operated through touch control or gravity sensing, thereby more conveniently and readily operating the smart TV.

As described with the embodiment, by fully exercising the zero-configuration and auto-searching functions featured by the UPnP, the remote control system for the smart TV provides communication between the smart TV 30 and the portable device 31. When operating the portable device 31, hardware information is transmitted to the smart TV 30 to control the smart TV, such that the smart TV 30 is directly controlled via somatosensory system control or touch control functions supported by the portable device 31. Thus, user experiences and interests are enhanced as the smart TV 30 can be controlled through somatosensory system control or touch control.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote control method for a smart TV with a multiple virtual devices, comprising:
   receiving function request information from a portable device by a smart TV in a Universal Plug and Play (UPnP) network;
   transmitting function information of the smart TV to the portable device according to the function request information;
   receiving hardware information replied from the portable device in response to the function information, wherein said hardware information comprises driver information, and said hardware information is written into a virtual device of the multiple virtual devices to drive said corresponding virtual device; and
   operating the portable device according to the hardware information.

2. The remote control method according to claim 1, wherein the hardware information comprises control information; and
   the step of performing the operation control according to the hardware information comprises:
   generating operation information by the virtual device according to the control information; and transmitting the operation information to a third-party application or an operating system at the terminal of the smart TV to perform the operation control.

3. A smart TV, coupled to a portable device via a UPnP network, comprising:
   a device declaration module, for receiving function request information from the portable device;
   a function description module, for transmitting function information to the portable device in response to the function request information;
   a control receiving module, for receiving hardware information replied according to the function information by the portable device, wherein the hardware information comprises control information;
   a terminal comprising a plurality of virtual devices; and
   a virtual driver module, for performing an operation control according to the hardware information;
   wherein the control receiving module further comprises:
   a writing unit, for writing the hardware information into various virtual devices, wherein the hardware information comprises driver information; and
   an initialization unit, for driving a corresponding virtual device of the virtual devices according to the driver information.

4. The smart TV according to claim 3, wherein the virtual driver module comprises:
   an operation information unit, for generating operation information according to the control information;
   an execution unit, for transmitting the operation information to a third-party application at the terminal of the smart TV or a local-end operating system to perform the operation control.

5. A remote control system for a smart TV, comprising:
   a portable device, comprising:
      a device locating module, for transmitting function request information in a UPnP network;
      a function acquiring module, for receiving function information; a hardware information retrieving module, for performing function matching and functions supported by the portable device and the function information, and collecting hardware information corresponding to the function information;
      a remote control module, for transmitting hardware information corresponding to the function information; and
      a function integrating module, for managing and distributing resources and operations of the device locating module, the function acquiring module, and the hardware information retrieving module; and
   a smart TV, comprising:
      a device declaration module, for receiving the function request information from the device locating module;
      a function description module, for transmitting function information of the smart TV to the function acquiring module in response to the function request information;
      a control receiving module, for receiving the hardware information, wherein the hardware information comprises control information for operating the smart TV;
      a virtual driver module, for performing an operation control according to the hardware information; and
      a logic control module, for integrating the device declaration module, the function description module, and the control receiving module to perform centralized resource distribution.

6. The remote control system according to claim 5, wherein a multiple of virtual devices are preset in the smart TV; and the control receiving module further comprises:
   a writing unit, for writing the hardware information into a corresponding virtual device of the virtual devices, wherein the hardware information comprises driver information; and
   an initialization unit, for driving the corresponding virtual device according to the driver information.

* * * * *